United States Patent [19]

Yamada et al.

[11] Patent Number: 4,978,516

[45] Date of Patent: Dec. 18, 1990

[54] PROCESS FOR TREATING TALC

[75] Inventors: Osamu Yamada, Tokyo; Kōzō Shinohara, Kawagoe, both of Japan

[73] Assignee: Asada Mill Co., Ltd., Tokyo, Japan

[21] Appl. No.: 385,312

[22] Filed: Jul. 25, 1989

Related U.S. Application Data

[63] Continuation-in-part of Ser. No. 157,928, Feb. 19, 1988, abandoned.

[30] Foreign Application Priority Data

Oct. 26, 1987 [JP] Japan ................. 62-269956

[51] Int. Cl.$^5$ .................. C01B 33/24; C01F 1/00
[52] U.S. Cl. ..................... 423/331; 423/161; 423/167; 423/169; 423/173
[58] Field of Search ............... 423/331, 167, 169, 173, 423/161; 75/2, 101 R

[56] References Cited

U.S. PATENT DOCUMENTS

| | | | |
|---|---|---|---|
| 3,533,821 | 10/1970 | Lundquist | 106/486 |
| 3,965,241 | 6/1976 | Baak et al. | 423/155 |
| 4,430,249 | 2/1984 | Gate | 423/331 |

FOREIGN PATENT DOCUMENTS

| | | | |
|---|---|---|---|
| 1041516 | 5/1976 | U.S.S.R. | |
| 1283033 | 7/1972 | United Kingdom | 423/331 |
| 1464530 | 2/1975 | United Kingdom | |

OTHER PUBLICATIONS

Takeda et al., "Introduction of the Measurement of Working Environments," Jun. 5, 1981, pp. 362–365 (Revised 2nd Ed.) partial translation.

Primary Examiner—John Doll
Assistant Examiner—Lori F. Cuomo
Attorney, Agent, or Firm—Frishauf, Holtz, Goodman & Woodward

[57] ABSTRACT

A process for improving a purity and/or whiteness degree of a talc powder is disclosed. A talc powder with a particle size of about 0.8 mm or less containing impurities such as asbestos, etc. is treated with a phosphoric acid agent under heating at from 70° to 250° C. to remove impurities such as asbestos, etc. by utilizing the difference in the rate of dissolution as between the talc and the impurities. The phosphoric acid agent is one selected from the group consisting of phosphoric acid, pyrophosphoric acid, sodium phosphate, ammonium phosphate, calcium phosphate, sodium tripolyphosphate, sodium pyrophosphate, sodium hexametaphosphate and mixtures thereof. Thus, asbestos, which is considered to be carcinogenic, can be effectively removed from talc.

24 Claims, 12 Drawing Sheets

T: TALC
C: CHLORITE

T: TALC
C: CHLORITE

T: TALC
D: DOLOMITE
M: MAGINESITE

PROCESS FOR TREATING TALC

This invention is a continuation-in-part application of U.S. Ser. No. 157,928 filed on Feb. 19, 1988, which is abandoned.

BACKGROUND OF THE INVENTION:

1. Field of the Invention

The present invention relates to a process for improving the purity and/or whiteness degree of a talc power containing impurities such as dolomite, magnesite and chlorite as well as asbestos.

2. Prior Art

Talc is a hydrous magnesium silicate which is present in the form of a natural mineral. This natural mineral contains impurities such as asbestos, dolomite, magnesite, chlorite, and calcium carbonate. Among these impurities, it is particularly necessary to remove asbestos since its carcinogenicity is becoming a serious problem these days.

Talc is widely used for pharmaceuticals, cosmetics, paints, paper making, plastics, etc. Since pharmaceuticals and cosmetics are applied directly to the human body, it is particularly essential that the talc that is used for them is free from asbestos.

Since talc is, in most cases, used in the form of powder, it is considerably difficult and impractical to effectively remove the asbestos which is mixed in the talc powder. Moreover, both talc and asbestos are chemically stable minerals and therefore difficult to separate by using an ordinary acid or alkali treatment, although trace amounts of talc and asbestos can be eluted from talc powder with a mineral acid such as hydrochloric, sulfuric or nitric acid. The Reference, "INTRODUCTION TO THE MEASUREMENT OF WORKING ENVIRONMENTS" (Revised Second Edition), Page 363, published by Korona-sha on June 5, 1981, discloses a method of measuring the quartz content of quartz and other ores using a weighing method which utilizes the difference between the rates of dissolution of the quartz and other ores in heated phosphoric acid. However, there is no disclosure or teaching with respect to improving the purity and whiteness of talc by utilizing the difference between the rates of dissolution of talc and impurities such as asbestos, etc. in heated phosphoric acid.

SUMMARY OF THE INVENTION

It is an object of the invention to provide a process for improving the purity and/or whiteness degree of a talc powder containing impurities such as asbestos, dolomite, magnesite, chlorite, etc. by treating talc powder with a particle size of about 0.8 mm or less with phosphoric acid or a phosphoric acid compound (hereinafter referred to as a "phosphoric acid agent") under heating at from 70° to 250° C. to remove asbestos and other impurities by utilizing the difference in the rate of dissolution between talc and impurities.

Other objects and advantages of the present invention may become apparent to those skilled in the art from the following description and the figures.

DETAILED DESCRIPTION OF THE PREFERRED EMBODIMENTS

Figure 1:
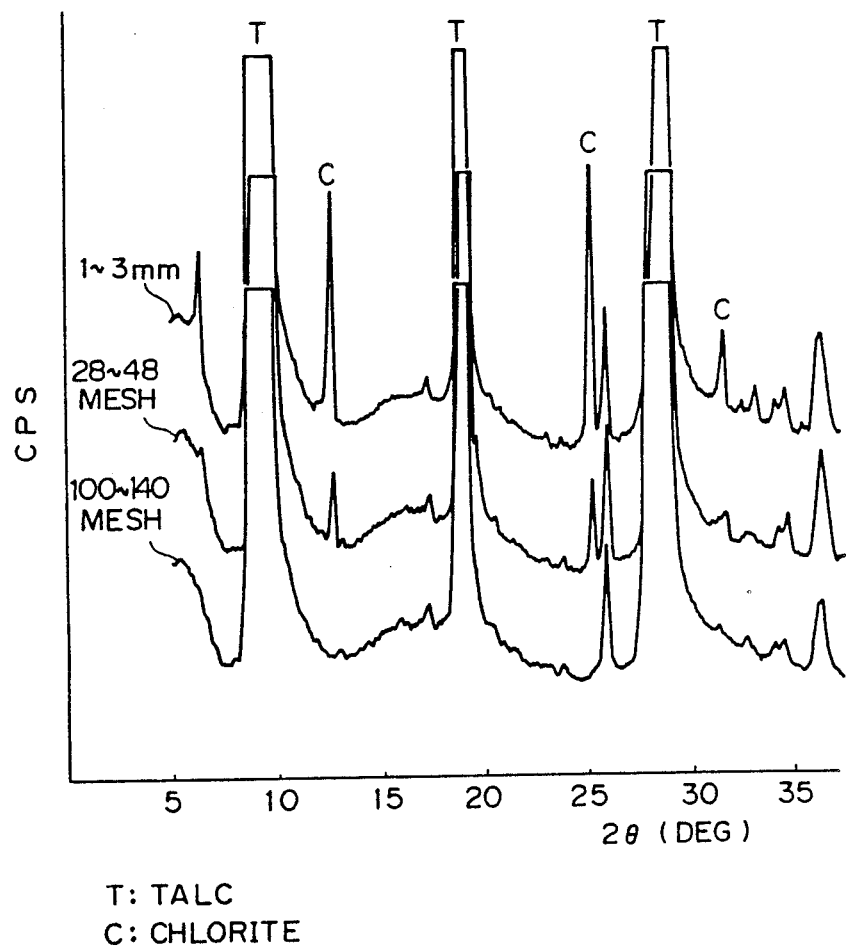
FIG. 1 consists of X-ray diffraction charts showing impurity measurement of samples of talc ore produced in China having three particle sizes after $H_3PO_4$ treatment; the respective particles sizes were 1-3 mm, 28-48 mesh and 100-145 mesh.

Examples of phosphoric acid agents which may be employed in the present invention include phosphoric acid; condensed phosphoric acids such as pyrophosphoric acid; ortho-phosphates such as sodium phosphate, ammonium phosphate and calcium phosphate; and condensed phosphates such as sodium tripolyphosphate, sodium pyrophosphate and sodium hexametaphosphate.

The talc powder is preferably treated at about 70° to 250° C. with the phosphoric acid agents in a concentration of about 85%, by weight, or more as $H_3PO_4$ under atmospheric pressure. A treatment temperature lower than 70° C. causes the reaction rate to lower unfavorably, whereas a temperature higher than 250° C. reduces the difference in the rate of dissolution between talc and asbestos such as to cause difficulty in the conducting of the process control. If the concentration of the phosphoric acid agents is less than about 85%, by weight, it can be easily concentrated to 85%, by weight, or more, by heating it at a temperature of 100° C. or more under atmospheric pressure.

The mechanism whereby impurities in talc powder, such as asbestos, can be separated by a treatment using a phosphoric acid agent has not yet been clarified. It is, however, considered that iron, aluminum, magnesium and the like which are contained in the asbestos mineral react with the phosphoric acid agent to disintegrate the crystal bond of asbestos which cannot be dissolved in hydrochloric acid and to thereby change the asbestos into a soluble substance which can be separated from talc. Other impurities which are contained in talc, such as dolomite and the like, are also dissolved and removed through an action similar to the above, resulting in an improvement in the degree of whiteness of the talc obtained.

A similar action also acts on the talc, but it is considered that, although the surface layer of talc, which has a multilayer crystal structure, is dissolved through a reaction with the phosphoric acid agent, the crystal structure of the talc is left intact inside the multilayer structure and there is therefore no change in the nature of the talc. Because of its multilayer structure, the rate of dissolution of talc is lower than those of asbestos and the other impurities. Accordingly, it is possible to remove asbestos and other impurities from talc by making use of the difference in the rate of dissolution. Since the surface layer of the multilayer structure of talc is subjected to the reaction described, it is possible to modify talc, which is originally hydrophobic, and to impart a hydrophilic nature thereto.

The following is an explanation of one experimental example carried out to measure the difference between asbestos (e.g., tremolite or chrysotile) and talc in terms of the rate of dissolution in a phosphoric acid agent.

Each of the following three samples (0.1 g) is added to 15 cc of a pyrophosphoric acid in concentration of about 85%, by weight, as $H_3PO_4$ under atmospheric pressure (a commercially available one) held at 150° C. and the mixture is then stirred. The rate of dissolution is defined as the period of time which begins when each sample is cast into the pyrophosphoric acid and which ends when the sample becomes completely dissolved in the solution such that the solution becomes transparent.

The results of the measurements are shown in Table 1 below.

TABLE 1

| Sample powders | Rate of dissolution (second) |
|---|---|
| tremolite | 165 |
| chrysotile | 149 |
| talc | 192 |

Although the rate of dissolution in pyrophosphoric acid is relatively high, as shown above, the dissolution rate in phosphoric acid is lower than the above. This fact facilitates the process control using phosphoric acid.

The following is an experiment carried out to measure the differences in the removal of asbestos (tremolite) using 30% hydrochloric acid, 30% nitric acid, 30% sulfuric acid and 30% phosphoric acid, respectively, utilizing process conditions in accordance with the subject invention.

Treatment 0.5 Grams of each of the talc samples, each having a particle size of less than 300 mesh and containing 0.5% of the tremolite, was cast into 100 cc of the mineral acids mentioned above, and held at a temperature of 100° C. under atmospheric pressure; each was then agitated for 1 hour with the above temperature being maintained constant. After the heat treatment, the recovered samples were washed with an amount of water corresponding to about 20 times the volume of that of the sample, and were then dried for 3 hours at 105° C.

Measurement

Figure 11:
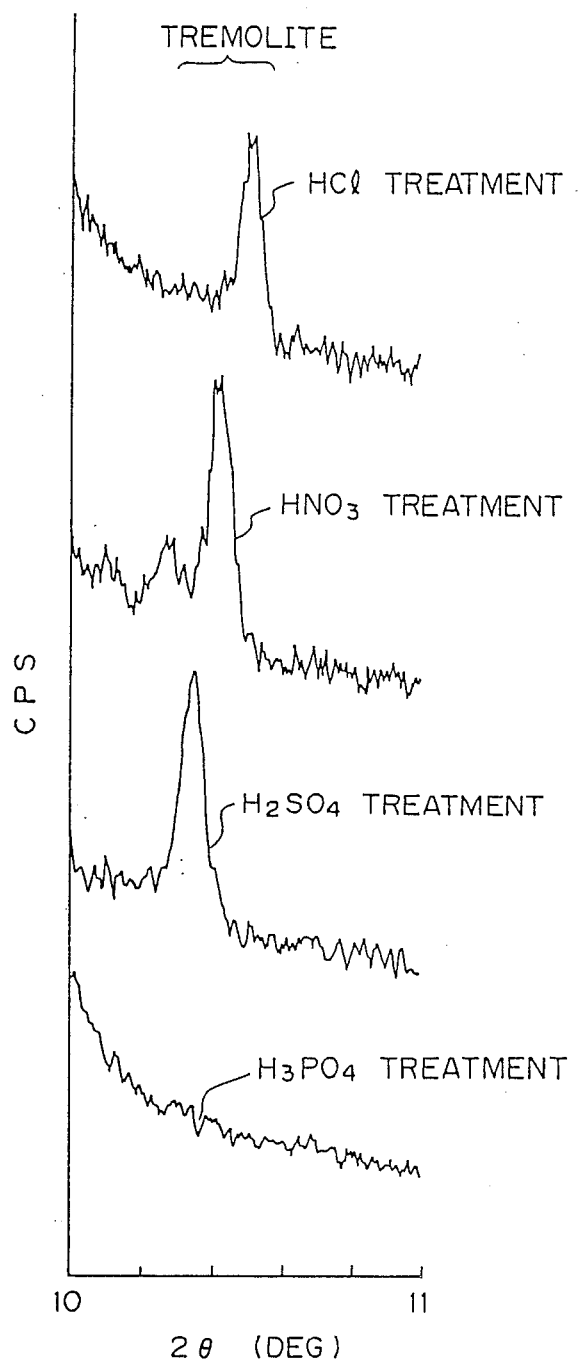
FIG. 11 consists of X-ray diffraction charts showing in raised sensitivity tremolite after HCl, $NHO_3$, $H_2SO_4$ or $H_3PO_4$ treatment of each of the samples containing 0.5% of the tremolite.

Asbestos (tremolite) measurements in the treated samples were made by X-ray diffraction (counter cathode: Cu; voltage/current: 50 kv, 180 mA; scanning rate: 0.124/min.) The results of the measurements are shown in Table 2 below and the attached FIG. 11.

TABLE 2

| Mineral acids | Initial conc. (wt %) | Conc. after heat treatment (wt %) | Amount of tremolite in treated samples (wt %) |
|---|---|---|---|
| HCl | 30 | 20.2 | 0.13 |
| $HNO_3$ | 30 | 68 | 0.24 |
| $H_2SO_4$ | 30 | 100 | 0.30 |
| $H_3PO_4$ | 30 | 85 | less than detectable value (0.05) |

Table 2 shows that the use of 30% phosphoric acid is significantly superior to 30% hydrochloric acid, 30% nitric acid or 30% sulfuric acid in a process of the subject invention.

The following is concerned with the effect of large amounts of calcium carbonate with respect to removing asbestos (tremolite) from talc, using 85% phosphoric acid in a process of the subject invention.

Samples (1) 0.5 g of talc containing 0.5% of the tremolite,
(2) 0.5 g of talc containing 0.5% of the tremolite mixed with 0.5 g of calcium carbonate.

Figure 12:
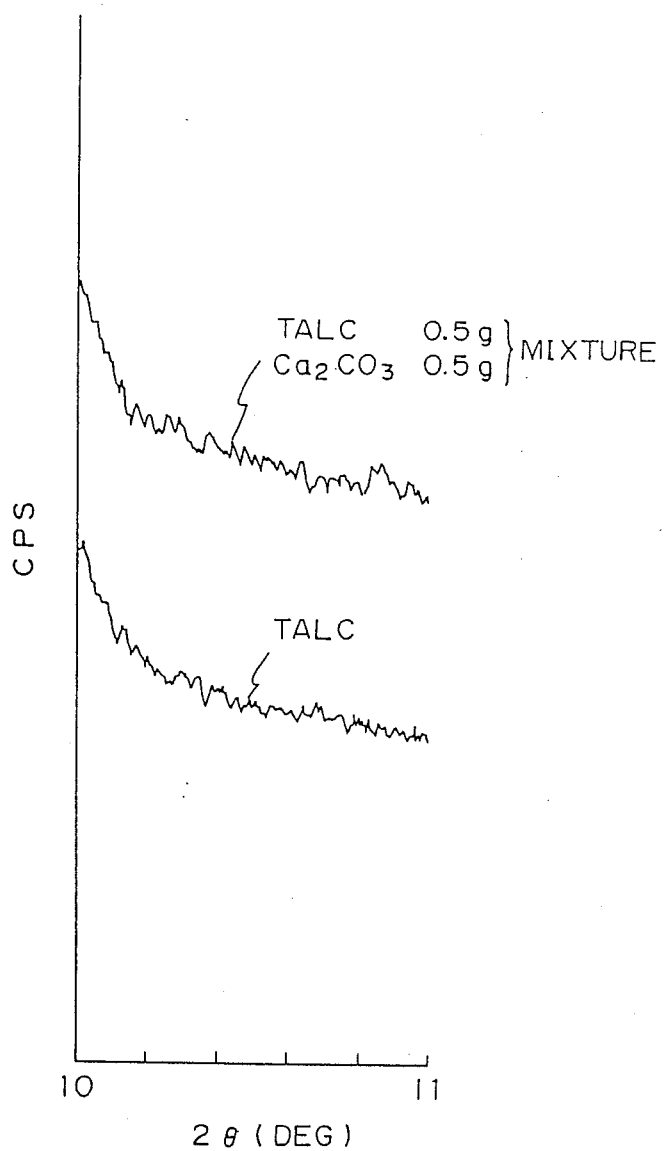
FIG. 12 consists of X-ray diffraction charts showing in raised sensitivity after $H_3PO_4$ treatment of two samples, one containing 0.5% of the tremolite and the other containing 0.5% of the tremolite mixed with 0.5% of calcium carbonate.

The treatment and measurement conditions were the same as those used in the above described experiments. The results are shown in Table 3 below and the attached FIG. 12.

TABLE 3

| Sample | Amount of tremolite in treated samples (wt %) |
|---|---|
| (1) | none detected |
| (2) | none detected |

Table 3 shows that a process of the subject invention is not affected by the presence of a large amount of calcium carbonate in the talc when removing asbestos (tremolite) therefrom.

Although the rate of reaction caused by a phosphoric acid agent depends on the kind and concentration of the agent employed and on the treatment temperature, it is possible to select optimal reaction conditions in accordance with the kind of talc which is to be treated and other requirements.

The effect of the particle size of the powder on the phosphoric acid agents was examined.

Samples

Talc ore produced in China was prepared so as to have the following particles sizes.
(1) 1-3 mm,
(2) 28-48 mesh, and
(3) 100-145 mesh.

Treatment

40 Grams of each of the samples having the above-described particle sizes was cast into 100 cc of commercially available pyrophosphoric acid held at a temperature of 160° C. under atmospheric pressure and then agitated for 30 minutes while that temperature was maintained. After completion of the heat treatment, the talc was washed with an amount of water which was about 20 times that of the talc, and then dried for 3 hours at 105° C.

Measurement

Each of the treated samples was crushed to bring the particle size to less than 300 mesh in order to have the respective samples tested under the same conditions, and the following measurements were then made by X-ray diffraction.
(1) Whiteness, and
(2) impurities in the talc.

The results of the measurements are shown in Table 4 below.

TABLE 4

| Item for measurement | 1–3 mm | 28–48 mesh | 100–145 mesh |
|---|---|---|---|
| Whiteness | 86.0° | 88.0° | 89.6° |
| Impurity other than talc | chlorite | chlorite | none detected |

The problem to be considered when talc is treated by a phosphoric acid agent is the form in which the impurities exist in the talc ore. Namely, the impurities are randomly dispersed in the talc ore, and the working process and the treatment conditions are varied according to the particle size of the impurities which are separated from the talc by the crushing treatment. It is generally considered that there is a continuous variation in the composition from the talc to the impurities in a large agglomerate of talc ore, and it is assumed that both are powdered in a mixed form. A particle in which the impurities are not separated is not fully affected in the depths of its interior by the treatment. Thus an examination of the particle size for the purpose of determining what size can be subjected to effective treatment is shown in Table 6.

Regarding the whiteness, this factor is enhanced as the particle size becomes smaller. Moreover, the impurities tend to decrease as the particle size becomes smaller. The amount of impurities (chlorite) in the 28–48 mesh sample was reduced by about ¼ in comparison with that of the 1–3 mm sample judging from the X-ray diffraction strength, and no remaining impurity was detected in the 100–145 mesh sample. Asbestos is considered to be dispersed substantially in the same form as the above-mentioned impurities, and it is assumed that the amount of asbestos is also decreased as the particle size becomes smaller.

The results of these samples allow one to see that the full effect of the treatment is revealed by the 28–48 mesh sample and that there is no practical problem with such a particle size, while treatment is required in the case of a particle size of less than 20 mesh (about 0.8 mm). It is preferable and effective to treat the talc ore with a particle size of less than 100 mesh (about 0.15 mm), and it is desirable to use treated talc with a particle size of less than 100 mesh in a field requiring a higher purity of talc.

FIG. 1 shows an X-ray diffraction chart (counter cathode: Cu; voltage/current: 30 kV, 30 mA; and scanning rate: 2°/minute) showing the impurity measurement of the samples of each of three particle sizes, namely, 1–3 mm, 28–48 mesh and 100–145 mesh.

The following Examples are provided for the purpose of further illustrating the present invention but are not to be construed as limiting.

EXAMPLE 1

Figure 2:
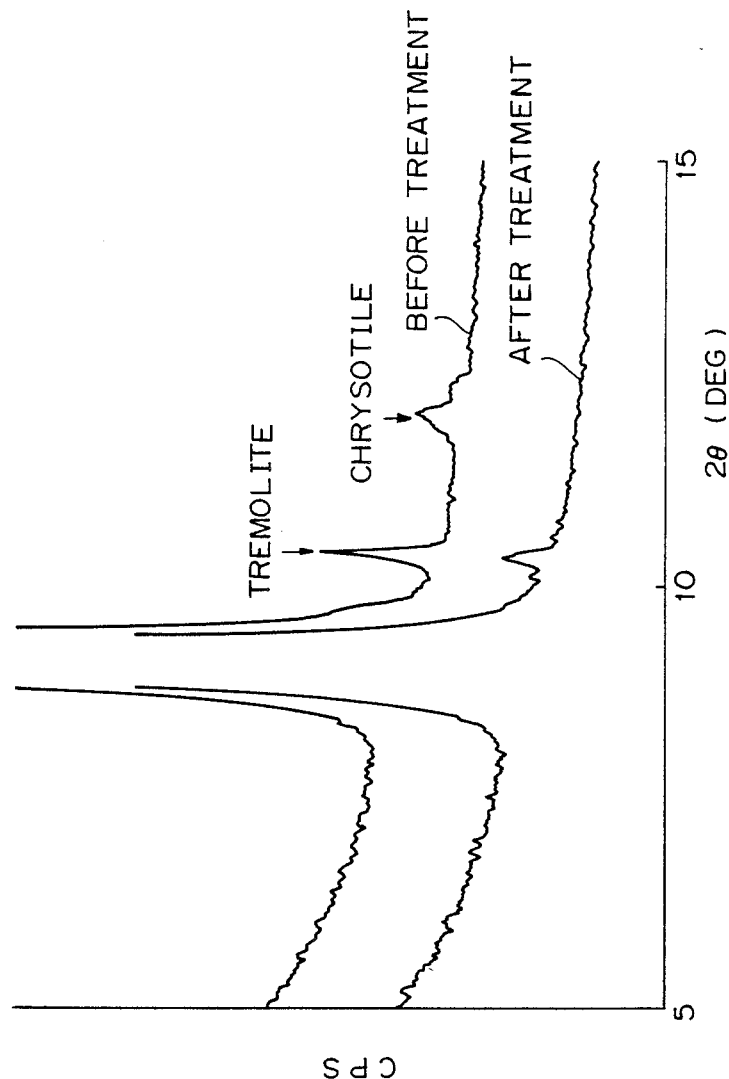
FIG. 2 consists of X-ray diffraction charts showing impurity measurement of talc powder consisting of Chinese talc ore with a particle size of 300 mesh pass before and after $H_3PO_4$ treatment.
Figure 3:
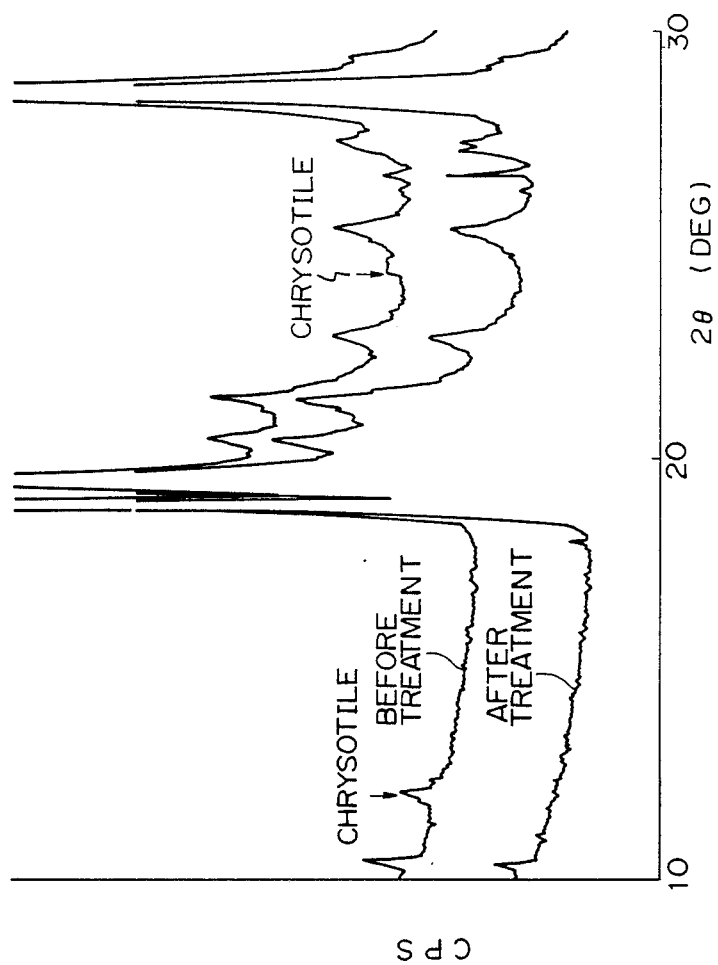
FIG. 3 consists of X-ray diffraction charts showing impurity measurement of talc powders consisting of another Chinese talc ore with a particle size of 300 mesh pass before and after $H_3PO_4$ treatment.

To 200 g samples each of two different talc powders produced in China (containing 2.0% of tremolite and 1.0% of chrysotile) with a particle size passed of 300 mesh pass, 1,600 cc of 85%-phosphoric acid solution was added and heated to 120° C. under atmospheric pressure under stirring. The mixture was held at this temperature for 50 minutes in order to treat the talc powder. After heating, the talc was collected by centrifugal separation, washed with an amount of water 10 times that of the talc, and then dried for 5 hours at 105° C. X-ray diffraction (voltage/current: 50 kV, 180 mA; scanning rate: 0.5°/minute; and counter cathode: Cu) of the talc powder carried out before and after the treatment confirmed that the talc after the treatment contained 0.5% of tremolite and no detectable amount of chrysotile, and no sign of destruction of the crystal structure was found in the talc after the treatment (see the accompanying drawings: FIGS. 2 and 3).

Tremolite has a peak discerned at an X-ray diffraction angle of $2\theta = 10.5°$, and chrysotile at $2\theta = 12.1°$ and 24.3°. It should be noted that the lower limit of the range detectable by X-ray diffraction is 1.0% for tremolite and 0.5% for chrysotile.

Further, the talc obtained after the treatment was observed with a microscope, but no asbestos was found therein.

The talc powder before the treatment was not dispersed in water unless it was forcibly stirred, whereas the talc powder after the treatment rapidly dispersed in water without the need to apply external force. Thus, it was confirmed that the talc powder had been modified and a hydrophilic nature imparted thereto by the treatment.

The degree of whiteness of the talc powder, which was 89.3° before the treatment, was increased to 92° by the treatment.

EXAMPLE 2

Comparison of the characteristics of non-treated talc powders, those treated with hydrochloric acid and those treated with phosphoric acid

Samples

Powder having a particle size of about 4 μm crushed from talc ore produced in China.

Treatment by hydrochloric acid

To 200 g of talc was added 1,000 parts of hot water and also 20 g of hydrochloric acid (36% of hydrogen chloride), and the mixture was boiled for 30 minutes. The resulting solution was suction filtered to recover the talc. The recovered talc was washed with hot water and filtered, and this process was repeated until no chlorine reaction was to be found in the filtrate. The recovered talc was dried at 105° C. to provide samples.

Treatment by phosphoric acid 200 g of talc was cast into 1,000 cc of an 85%-phosphoric acid solution held at 190° C. under atmospheric pressure and then agitated for 30 minutes while being held at that temperature. After the heat treatment, the talc was subjected to centrifugal separation, to washing with an amount of water about 20 times that of the talc and then to a drying process at 105° C. for 3 hours to provide samples. The comparative characteristics of each of the prepared samples are shown in Table 5, below.

TABLE 5

| Item for measurement | Before treatment | HCl treatment | $H_3PO_4$ treatment |
|---|---|---|---|
| Chemical composition | | | |
| $SiO_2$ | 60.6% | 62.0% | 62.7% |
| MgO | 31.3 | 31.3 | 30.6 |
| CaO | 0.42 | 0.015 | 0.023 |
| $Al_2O_3$ | 0.76 | 0.52 | 0.08 |
| $Fe_2O_3$ | 0.63 | 0.48 | 0.55 |
| $Na_2O$ | 0.013 | 0.013 | 0.017 |
| $K_2O$ | 0.003 | 0.002 | 0.004 |
| Ig,Loss | 5.56 | 5.02 | 4.88 |
| Whiteness | 91.4° | 91.8° | 93.4° |
| Mean particle diameter | 3.60 μm | 3.68 μm | 4.50 μm |
| Impurities other than talc | chlorite dolomite | chlorite | |
| Asbestos (tremolite) content | 0.10% | 0.09% | less than detection value |

Although it is usual for some impurities to remain even with a relatively high purity talc, it is possible to improve the purity of talc even more by treating with a phosphoric acid. Table 5 shows the comparative characteristics of Chinese talc powders subjected to normal hydrochloric acid and phosphoric acid treatments.

With the hydrochloric acid treatment, it is possible to remove dolomite impurities from talc, judging from the decrease in the amount of CaO and the result of X-ray diffraction, but it is impossible to remove chlorite and asbestos.

With the phosphoric acid treatment, on the other hand, it is possible to remove dolomite, chlorite and asbestos. The reduction in the amounts of CaO and $Al_2O_3$ among the chemical contents results from the removal of these impurities; consequently the composition is near the theoretical values of that of talc. It is also observed that the whiteness is increased by the removal of the impurities.

Regarding the distribution of the particle sizes in each of the samples, it is seen that, in comparison with the non-treated sample, amount of fine particles with a particle size of less than 2 μm in the phosphoric acid treated sample is reduced by about 10% and the mean particle diameter is shifted to the 1.4 μm rough region. The impurities contained in talc are harder than talc itself so that they are easily crushable and tend to be deflected to the fine particle region more than the talc in the powder does. Furthermore, the reaction to phosphoric acid is promoted as the particle size becomes smaller by virtue of the increased surface area. This tendency can also be applied to talc, and with the treatment by a phosphoric acid agent the fine particles of less than 2 μm are dissolved at an earlier stage so that the mean particle size is shifted to the rough region. The treatment by hydrochloric acid also shows a similar tendency, but this is caused by the dissolution of dolomite, and the residual impurities of chlorite and asbestos and fine particle talc are not dissolved, so that this tendency is low in comparison with the treatment by phosphoric acid.

Figure 4:
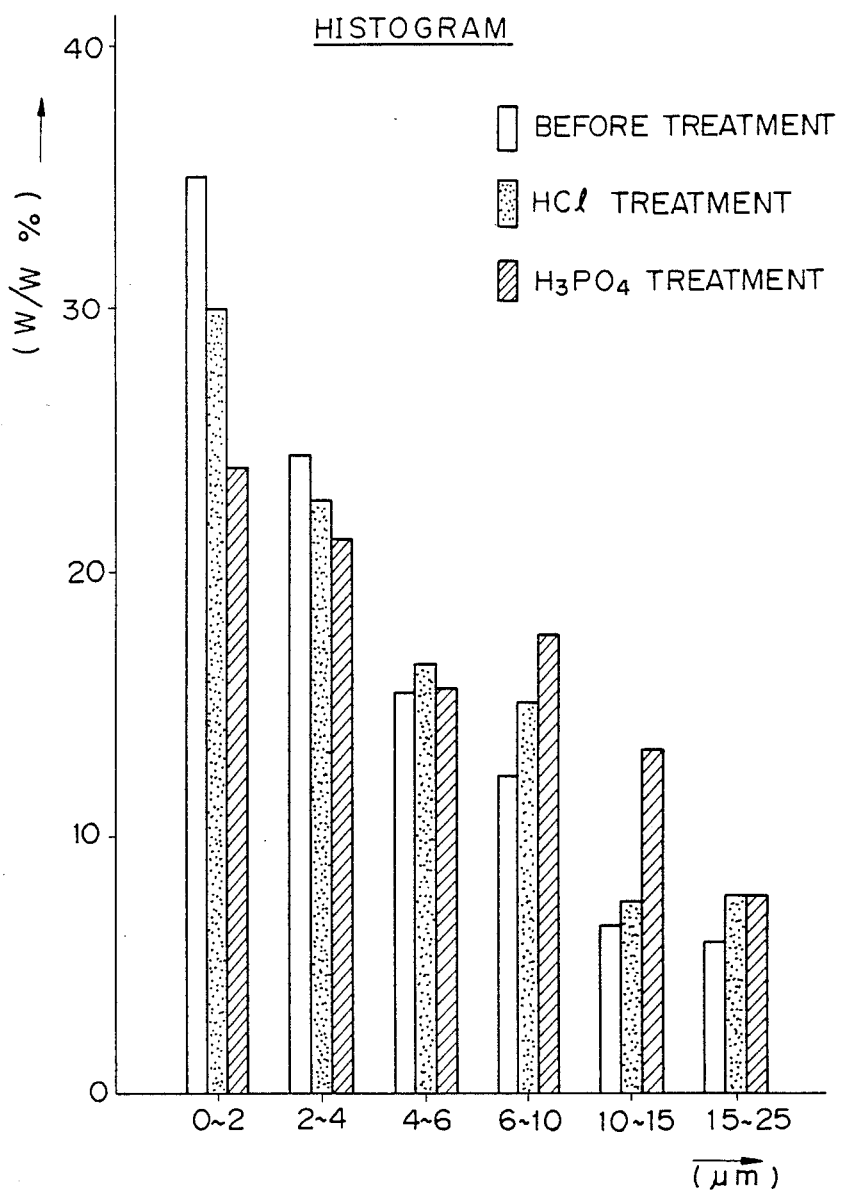
FIG. 4 is a histogram showing the particle distribution of talc powders before and after HCl and $H_3PO_4$ treatments, the talc powders having a particle size of about 4 μm of Chinese talc ore.
Figure 5:
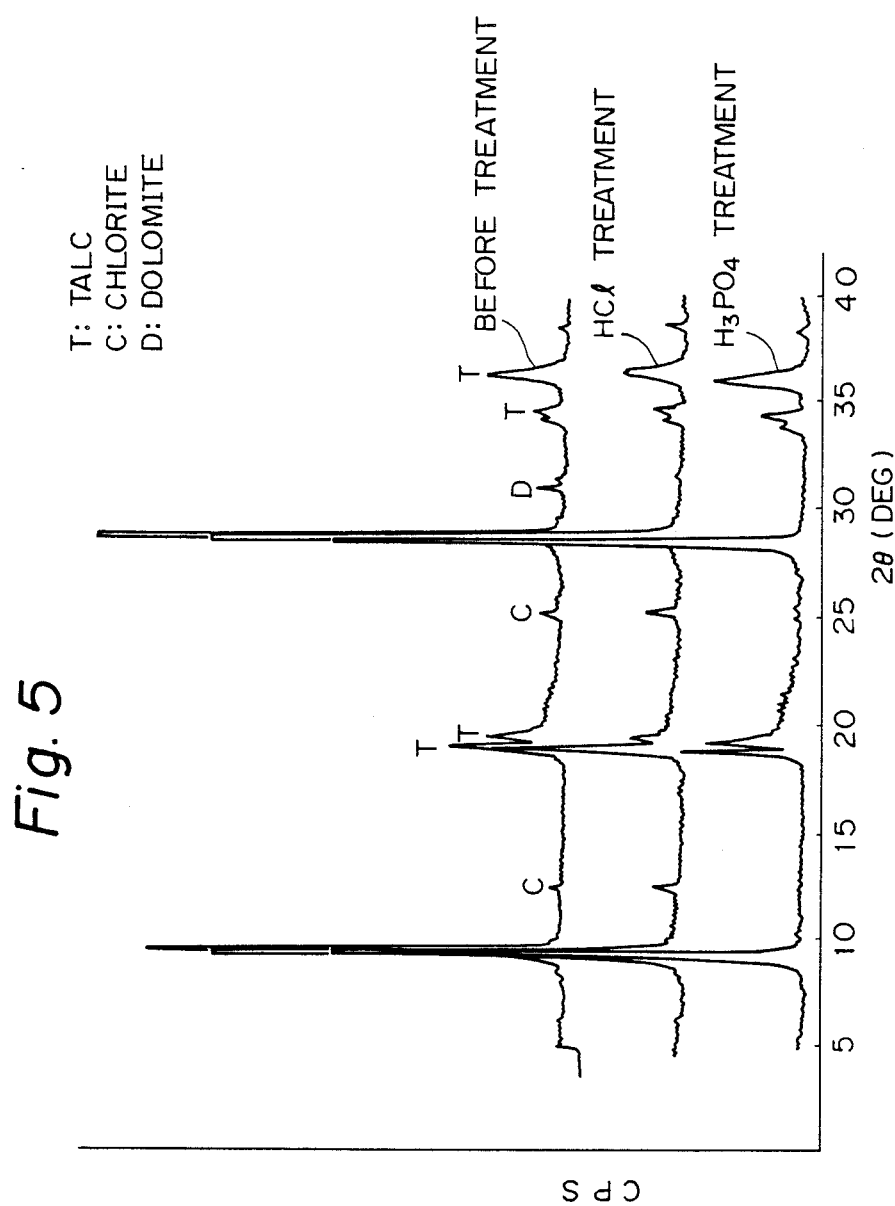
FIG. 5 consists of X-ray diffraction charts showing impurity measurement before and after HCl and $H_3PO_4$ treatments of the talc powders indicated in FIG. 4.
Figure 6:
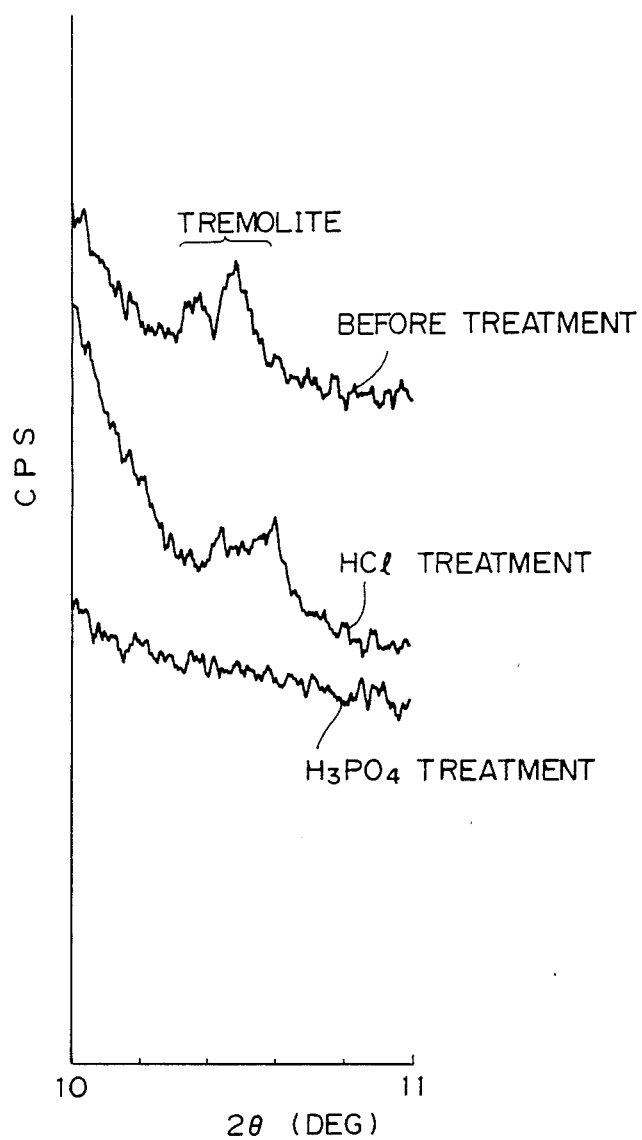
FIG. 6 consists of X-ray diffraction charts showing in raised sensitivity tremolite before and after HCl and $H_3PO_4$ treatments of the talc powders indicated in FIG. 4.

In FIG. 4 is shown a histogram of the particle distribution (measured by the liquid phase settling method, using SKC-2000 manufactured by Seishin Kigyo), while in FIG. 5 are shown X-ray charts (counter cathode: Cu; voltage/current: 30 kV, 15 mA; and scanning rate: 2°/minute) of measurements of the impurities in talc, and in FIG. 6 are shown X-ray diffraction charts in raised sensitivity (counter cathode: Cu; voltage/current: 50 kV, 180 mA; and scanning rate: 0.124°/minute) of measurements of asbestos (tremolite).

EXAMPLE 3

Change in whiteness

Samples

Powder of Chinese talc ore of low purity crushed to a particle size of 300 mesh.

Treatment by phosphoric acid

Same as that of Example 2.

The comparative characteristics of the prepared samples are shown in Table 6, below.

TABLE 6

| Item for measurement | Before treatment | $H_3PO_4$ treatment |
|---|---|---|
| Chemical composition | | |
| $SiO_2$ | 39.0% | 79.3% |
| MgO | 32.1 | 9.70 |
| CaO | 0.25 | 0.036 |
| $Al_2O_3$ | 12.3 | 0.53 |
| $Fe_2O_3$ | 1.39 | 0.11 |
| $Na_2O$ | 0.029 | 0.084 |
| $K_2O$ | 0.14 | 0.14 |
| Ig.Loss | 11.26 | 6.66 |
| Whiteness | 78° | 82.5° |
| Impurities other than talc | chlorite dolomite α-quartz | α-quartz |

The powder used in this example was mainly composed of chlorite and dolomite and the talc content was very low at about 20–25%. As a result, the whiteness was low at 78° and the number of fields in which this powder can be utilized are extremely limited due to the low talc purity and low degree of whiteness.

After the application of the phosphoric acid treatment, the changes shown in Table 2 were observed. The most remarkable change was the increase by about 4.5° in the whiteness and the removal of the chlorite and dolomite impurities. This change makes it possible to use the powder in fields in which the conventional powder has not been applicable. Since the whiteness is fixed as a criterion of the market price of talc, the treatment makes it possible to raise the price of the talc and enhance the economic value thereof.

Although α-quartz remains in the powder after the treatment, the crystal structure of α-quartz is rigid and the rate of reaction thereof is low. Thus only an extremely small amount of α-quartz can be dissolved which makes it difficult to achieve the complete removal thereof.

Figure 7:
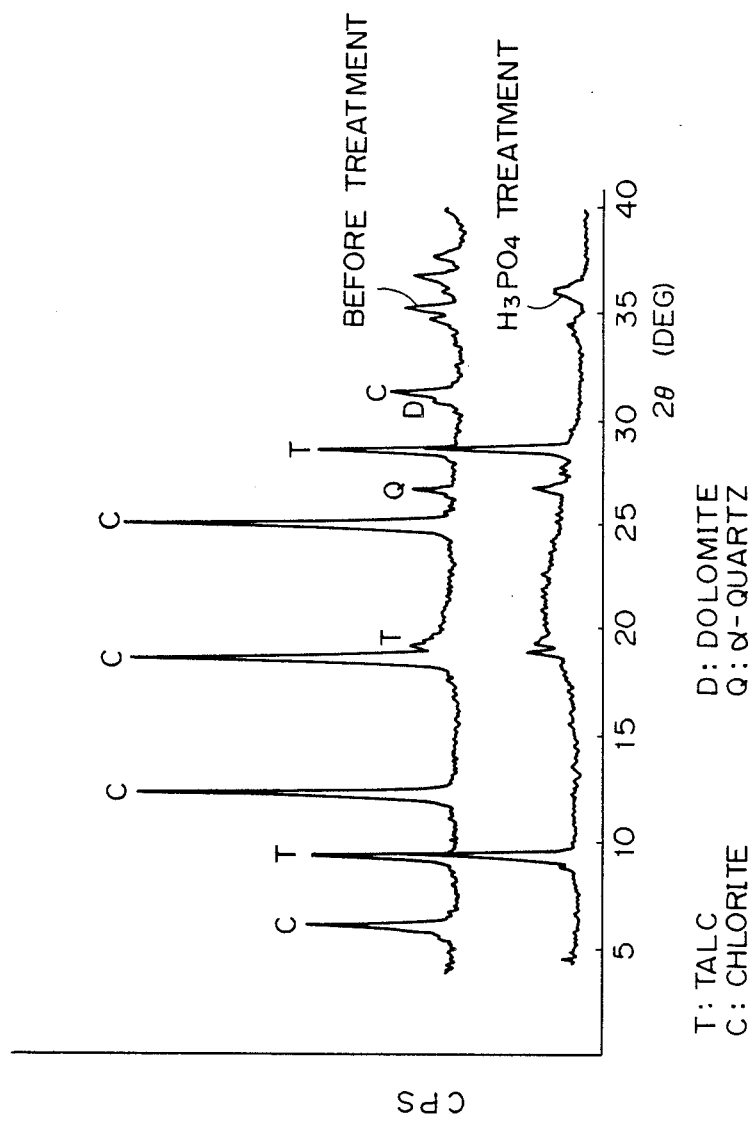
FIG. 7 consists of X-ray diffraction charts showing impurity measurement before and after $H_3PO_4$ treatments of samples of Chinese talc ore of low purity crushed to a particle size of 300 mesh.

The whiteness measurement was made using a Hunter whiteness meter (blue filter). FIG. 7 shows X-ray diffraction charts (counter cathode: Cu; voltage/current: 30 kV, 15 mA; and scanning rate: 2°/minute) of the measurements of the impurities in talc.

EXAMPLE 4

Comparative characteristics of Canadian talc before and after treatment

Samples

Prepared from Canadian talc ore to be of 200 mesh type.

Treatment 300 g of the sample were cast into 1,000 cc of an 85%-phosphoric acid agent held at 140° C. under atmospheric pressure and then agitated for 30 minutes while maintaining that temperature. After the heat treatment, talc was recovered by centrifugal separation and washed with an amount of water about 20 times that of the talc, and then dried for 2 hours.

The comparative characteristics before and after the treatment are shown in Table 7, below.

TABLE 7

| Item for measurement | Before treatment | $H_3PO$ treatment | Measuring method |
|---|---|---|---|
| moisture | 0.20% | 0.25% | Infrared ray type moisture meter |
| Whiteness | 72.0° | 81.8° | Hunter whiteness meter (blue filter) |
| Apparent density | 0.67 g/cc | 0.57 g/cc | JIS* K 5101 |
| Specific volume | 0.90 cc/g | 0.96 cc/g | JSCI** II |
| Rate of particle transmission (45 μm) | 76.4% | 81.8% | JIS K 5101 |
| Oil absorption | 32 cc/100 g | 40 cc/100 g | JIS K 5101 |
| pH | 9.3 | 6.9 | JIS K 5101 |
| Purity test criteria for cosmetic materials | | | |
| Acid soluble material | suitable (1.3%) | suitable (0.1%>) | JSCI II |
| water soluble material | suitable (0.05%) | suitable (0.08%) | JSCI II |
| Liquidity | suitable | suitable | JSCI II |
| Carbonate | suitable | suitable | JSCI II |
| Iron | suitable (0.7%>) | suitable (0.7%>) | JSCI II |
| Arsenic | unsuitable (4 ppm<) | suitable (4 ppm>) | JSCI II |
| Loss on ignition (500° C.) | suitable (0.53%) | suitable (0.10%) | JSCI II |
| Chemical composition | | | |
| $SiO_2$ | 58.7% | 60.7% | |
| MgO | 30.1 | 30.0 | |
| $Al_2O_3$ | 0.09 | 0.06 | |
| $Fe_2O_3$ | 0.58 | 0.55 | |
| $CaO_2$ | 0.39 | 0.011 | |
| $Na_2O$ | 0.010 | 0.013 | |
| $K_2O$ | 0.001 | 0.002 | |
| $TiO_2$ | 0.003 | 0.003 | |
| Ig.Loss | 5.76 | 4.68 | |
| Impurities other than talc | Dolomite magnesite | not detected | X-ray diffraction method (counter cathode: Cu: voltage/current: 30 kV, 15 mA, scanning rate: 2°/min.) |
| Asbestos Tremolite Chrysotile | Less than detection value | Less than detection value | X-ray diffraction method (counter cathode: Cu; voltage/current: 50 kV, 180 mA; scanning rate: 0.124°/min.) |

*JIS: Japenese Industrial Standard
**JSCI: Japanese Standard of Cosmetic Ingredients Judging from the chemical composition and X-ray diffraction charts, the Canadian talc has a relatively high talc purity and contains no asbestos. However, the whiteness is low at 72.0° and arsenic is contained in the talc so that it cannot be used as a cosmetic material.

With the phosphoric acid treatment, the whiteness increased by about 10°, the arsenic content was lowered to less than 4 ppm and the rough feeling on the skin was ameliorated so that the talc could be used as a cosmetic material and the range of other applicable fields could be expected to expand. In this example, 200 mesh type samples were used, but it can be expected that the whiteness could be enhanced even more by crushing the talc to a smaller particle size and then treating it.

Although the talc contains some impurities (dolomite and magnesite), they were completely removed by the treatment. Furthermore, the non-treated sample had a pH value of 9.3, but Mg and Ca which affect the pH value can be removed by the treatment so that the pH value of the treated sample can be settled in the neutral region, and by treating with phosphoric acid the surface layer of the talc is slightly dissolved to that the hydropholic surface thereof is broken to assume a hydrophilic nature, and the oil absorption properties are also improved. Thus, these new characteristics are additional in comparison with the conventional talc.

Figure 8:
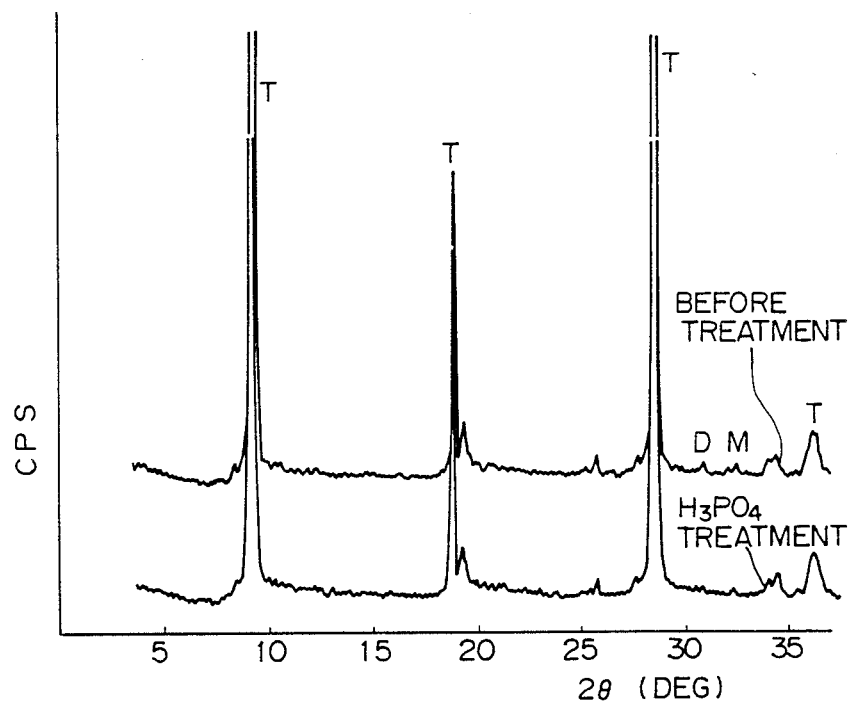
FIG. 8 consists of X-ray diffraction charts showing impurity measurement before and after $H_3PO_4$ treatments of samples of Canadian talc ore crushed to a particle size of 200 mesh.
Figure 9:
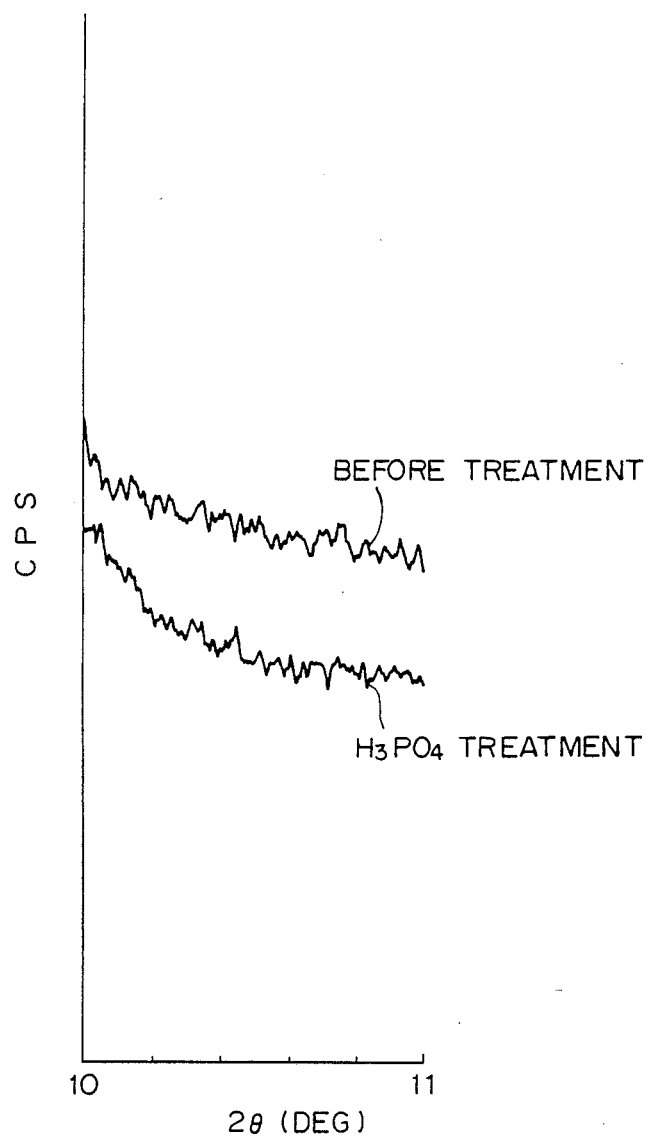
FIG. 9 consists of X-ray diffraction charts showing in raised sensitivity tremolite before and after $H_3PO_4$ treatment of the samples indicated in FIG. 8.
Figure 10:
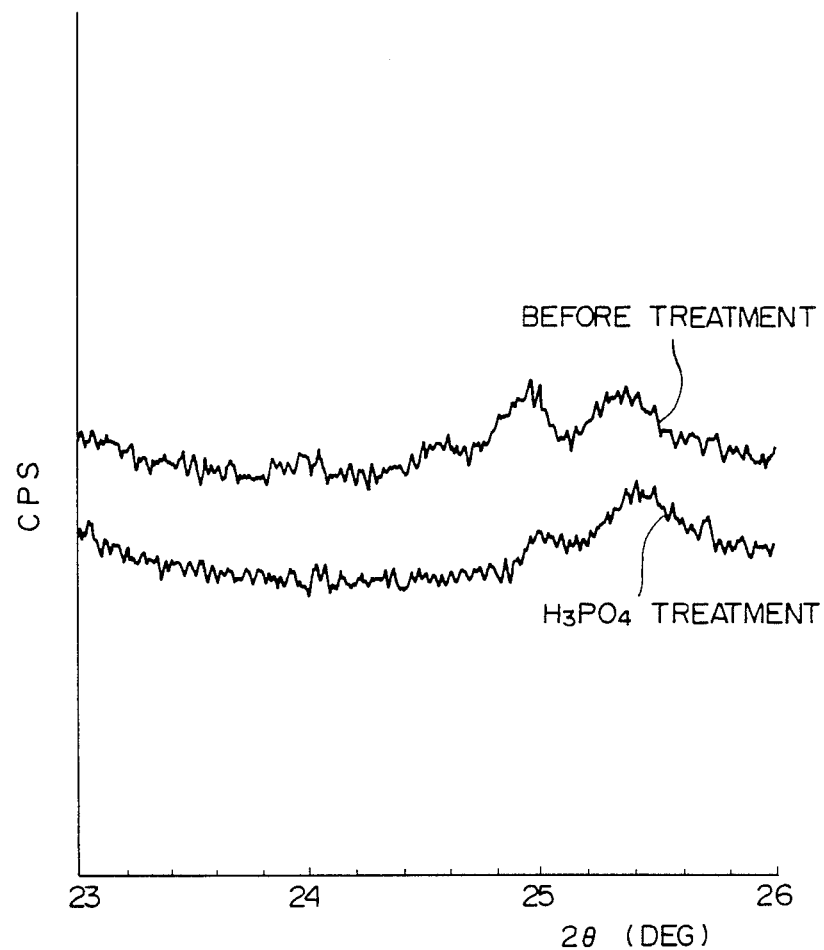
FIG. 10 consists of X-ray diffraction charts showing in raised sensitivity chrysotile before and after $H_3PO_4$ treatment of the samples indicated in FIG. 8.

FIG. 8 shows X-ray diffraction charts of measurements of the impurities in talc, and FIGS. 9 and 10 show X-ray diffraction charts measured in raised sensitivity of tremolite and chrysotile, respectively, before and after $H_3PO_4$ treatments.

What is claimed is:

1. A process for improving both the degree of purity and whiteness of a talc powder comprising heating a talc powder having a particle size of about 0.8 millimeters or less containing at least one impurity selected from the group consisting of asbestos, dolomite, magnesite, chlorite and calcium carbonate, with a phosphoric acid agent in a concentration of about 85%, by weight, as $H_3PO_4$ at a temperature between 70° and 250° C. under atmospheric pressure to remove at least one of the aforementioned impurities therefrom by utilizing the difference in the rate of dissolution between the talc and said one or more impurities 2. The process according to claim 1, wherein said phosphoric acid agent in a concentration of about 85%, by weight as $H_3PO_4$ is produced by heating a phosphoric acid agent having a concentration of less than about 85% by weight, as $H_3PO_4$ and the talc powder at a temperature of at least 100° C.

3. The process according to claim 1, wherein said talc powder has a particle size of about 0.15 millimeters or less.

4. The process according to claim 1, wherein said phosphoric acid agent is selected from the group consisting of phosphoric acid, pyrophosphoric acid, sodium phosphate, ammonium phosphate, calcium phosphate, sodium tripolyphosphate, sodium pyrophosphate, sodium hexametaphosphate and mixtures thereof.

5. The process according to claim 2, wherein said talc powder has a particle size of about 0.15 millimeters or less.

6. The process according to claim 2, wherein said phosphoric acid agent is selected from the group consisting of phosphoric acid, pyrophosphoric acid, sodium phosphate, ammonium phosphate, calcium phosphate, sodium tripolyphosphate, sodium pyrophosphate, sodium hexametaphosphate and mixtures thereof.

7. The process according to claim 1 wherein said talc contains asbestos as an impurity which is removed.

8. The process according to claim 2 wherein said talc contains asbestos as an impurity which is removed.

9. The process according to claim 7, wherein said talc powder has a particle size of about 0.15 millimeters or less.

10. The process according to claim 9, wherein said phosphoric acid agent is selected from the group consisting of phosphoric acid, pyrophosphoric acid, sodium phosphate, ammonium phosphate, calcium phosphate, sodium tripolyphosphate, sodium pyrophosphate, sodium hexametaphosphate and mixtures thereof.

11. The process according to claim 8, wherein said talc powder has a particle size of about 0.15 millimeters or less.

12. The process according to claim 11, wherein said phosphoric acid agent is selected from the group consisting of phosphoric acid, pyrophosphoric acid, sodium phosphate, ammonium phosphate, calcium phosphate, sodium tripolyphosphate, sodium pyrophosphate, sodium hexametaphosphate and mixtures thereof.

13. The process according to claim 7, wherein said phosphoric acid agent is phosphoric acid.

14. The process according to claim 8, wherein said phosphoric acid agent is phosphoric acid.

15. The process according to claim 9, wherein said phosphoric acid agent is phosphoric acid.

16. The process according to claim 11, wherein said phosphoric acid agent is phosphoric acid.

17. The process according to claim 1, wherein said phosphoric acid agent is phosphoric acid.

18. The process according to claim 2, wherein said phosphoric acid agent is phosphoric acid.

19. The process according to claim 3, wherein said phosphoric acid agent is phosphoric acid.

20. The process according to claim 5, wherein said phosphoric acid agent is phosphoric acid.

21. The process according to claim 1, wherein said phosphoric acid agent is pyrophosphoric acid.

22. The process according to claim 2, wherein said phosphoric acid agent is pyrophosphoric acid.

23. The process according to claim 9, wherein said phosphoric acid agent is pyrophosphoric acid.

24. The process according to claim 11, wherein said phosphoric acid agent is pyrophosphoric acid.

* * * * *